United States Patent [19]
Fahey et al.

[11] 3,990,044
[45] Nov. 2, 1976

[54] SYMBOL RECOGNITION ENHANCING APPARATUS

[75] Inventors: William David Fahey, Cupertino; Robert Wayne Lotz, Mountain View; Jack Wendel Newhard, Cupertino, all of Calif.

[73] Assignee: The Singer Company, Binghamton, N.Y.

[22] Filed: July 7, 1975

[21] Appl. No.: 593,349

[52] U.S. Cl. .............. 340/146.3 H; 340/146.3 MA
[51] Int. Cl.² ........................................ G06K 9/12
[58] Field of Search .......... 340/146.3 AC, 146.3 H, 340/146.3 AG, 146.3 MA

[56] References Cited
UNITED STATES PATENTS

| | | | |
|---|---|---|---|
| 3,196,398 | 7/1965 | Baskin | 340/146.3 H |
| 3,234,513 | 2/1966 | Brust | 340/146.3 MA |
| 3,483,512 | 12/1969 | Atkins | 340/146.3 MA |
| 3,573,789 | 4/1971 | Sharp et al. | 340/146.3 H |
| 3,723,970 | 3/1973 | Stoller | 340/146.3 MA |
| 3,846,754 | 11/1974 | Oka et al. | 340/146.3 MA |

Primary Examiner—Leo H. Boudreau
Attorney, Agent, or Firm—Paul Hentzel; James C. Kesterson

[57] ABSTRACT

Symbols from printed labels are imaged onto a photoresponsive matrix. The matrix is scanned, column by column, to provide a digital data stream characteristic of the symbol with a bit corresponding to each matrix element. Each matrix element is examined by a decision-making device to determine what the state of the subject element should be based on the actual states of a group of examination elements adjacent to the subject element. The makeup of the examination group and the specific algorithm of the hardware (or software) will vary with each type of application. The examination group for a character stroke widener (FIGS. 2 and 3) is formed by seven matrix elements: the subject element, plus the three immediately previously scanned elements in the same column as the subject element, plus the three elements in the same row as the subject element in the three immediately previously scanned columns. A stroke-widening algorithm widens the symbol stroke width by one bit if the stroke width is either one or two elements wide. The symbol stroke is widened to promote character recognition by the "peep hole" or fine encoding point technique.

15 Claims, 6 Drawing Figures

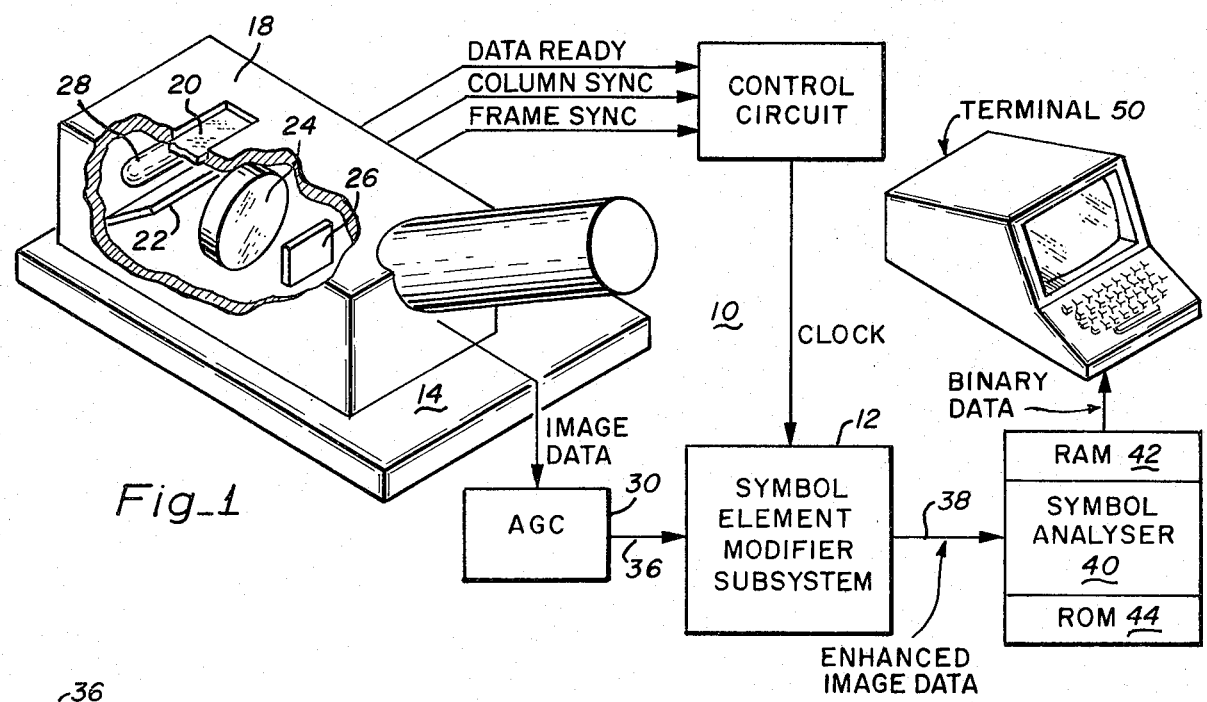
Fig_1
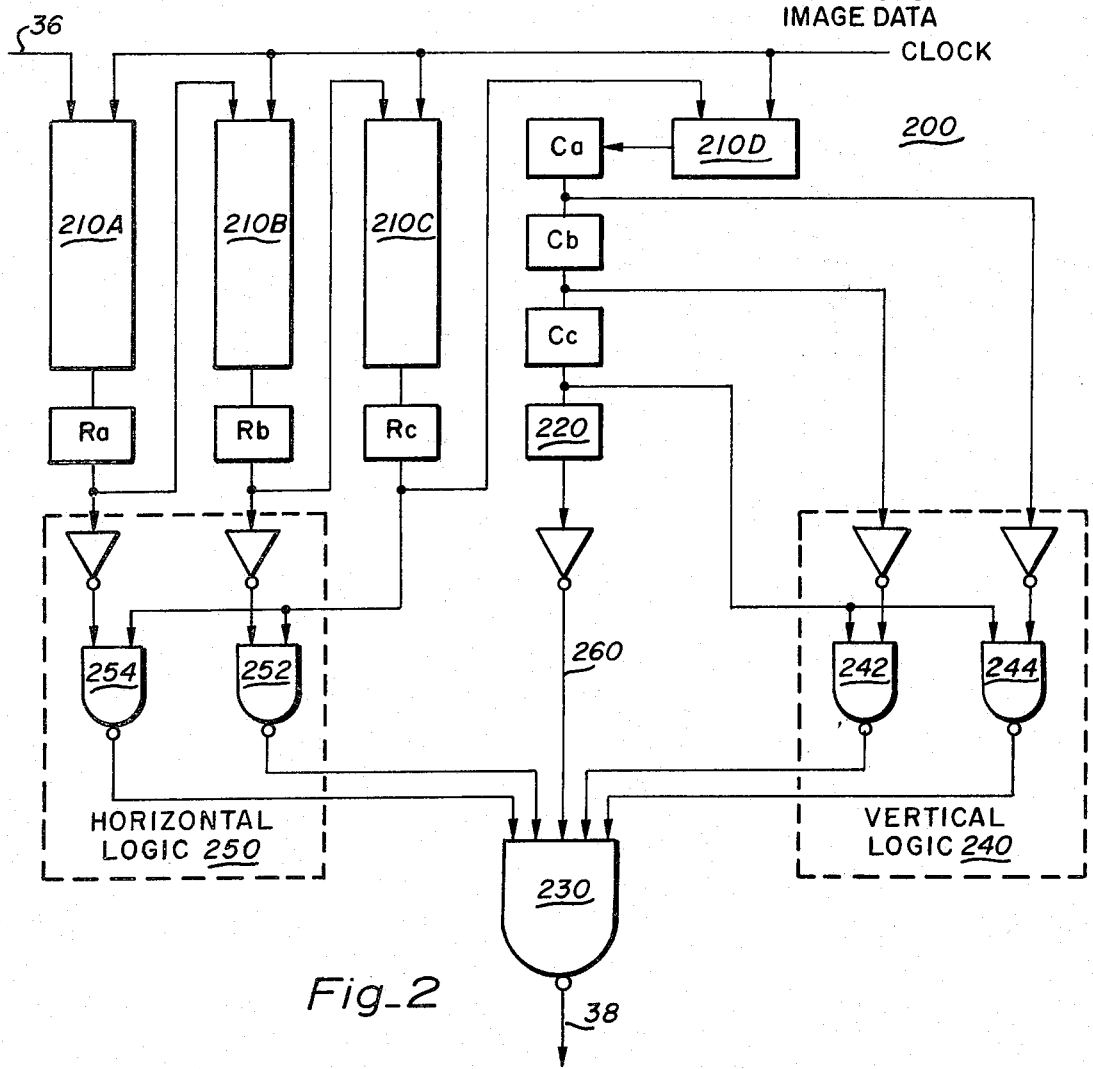
Fig_2

SYMBOL RECOGNITION ENHANCING APPARATUS

BACKGROUND OF THE INVENTION

1. Field of the Invention

This invention relates to symbol recognition and more particularly to systematically modifying the digital image of the symbol to enhance recognition reliability.

2. Description of the Prior Art

Heretofore, printed symbols have been recognized by the peep hole technique without enhancement. Inaccuracies inherent in the printing process create deviations between like numbers or letters which complicate the recognition process. The identical symbol may have a wide or thin stroke depending on the type-to-paper pressure, the characteristics of the paper, the condition of the type, the quantity of ink, etc. The myriads of slightly different type fonts compound the symbol deviation problem. Further, the process of forming a matrix image of photosensitive elements from the printed image is at best an approximation, the fidelity of which is limited by the resolution of the matrix. The deviations between like symbols increases the number of fine encoding points required to maintain an acceptable reject-error rate. The fine encoding point recongnition technique is described in more detail in U.S. Pat. No. 3,382,482 filed Oct. 17, 1961 by R. B. Greenly entitled, "Character Recognition System" and in a publication entitled "Optical Character Recognition Based on Peephole Template Matching" by Klaus. Maass appearing in Computer Design, December 1965, p. 18—23.

SUMMARY OF THE INVENTION

It is therefore an object of this invention to provide:

a system for enhancing the peephole recognition reliability of symbols;

a system for symbol recognition requiring fewer fine encoding points to identify each symbol;

a system for symbol recognition which does not require a high resolution detection device;

a device for normalizing the digital image of symbols to overcome deviations between like matrix images;

a device for standardizing the stroke width of digital images;

a device for minimizing offsetting during imaging; and a device for minimizing edge irregularities, background noise, and voids.

These and other objects are accomplished by providing a digitizer device having a row and column matrix of elements responsive to the input symbols for providing an element or digital image of the symbol. The digital image is a quantized approximation of the input symbol formed by the activated elements of the matrix. The matrix is scanned to provide a digital data flow containing the status of the matrix of elements. A data flow device such as a clocked shift register systematically advances the data for each element to an examination status and holds the data for each element in an examination zone associated with the current examination zone. A hardware or software decision device is responsive to the status of the elements within the examination zone for controlling the status of the examined element in accordance with a predetermined enhancement algorithm.

BRIEF DESCRIPTION OF THE DRAWING

Further objects and advantages of the character enhancer and the operation of the system will become apparent from the following detailed description taken in conjunction with the drawings, in which:

FIG. 1 is an isometric-block diagram rendition of the character enhancement and recognition system;

FIG. 2 is a detailed logic circuit of a stroke widening embodiment of the FIG. 1 system;

THE SYMBOL RECOGNITION SYSTEM

Figure 3A:
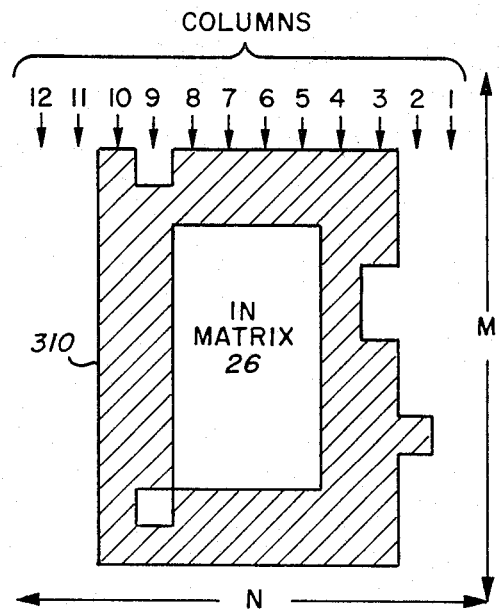
FIG. 3 illustrates the before and after state of an "0" symbol which has been enhanced by the FIG. 2 stroke widener.

FIG. 1 shows a merchandise checkout system 10 employing the symbol element modifier subsystem 12 for enhancing the data font of information labels on merchandise unit 14. Unit 14 has symbols affixed or displayed thereon, which are detected by detection device 18. Preferably, the symbols are human-readable alpha-numerics in the conventional printed image medium. However, the symbols may be magnetic, embossed, or in any manner formed in or associated with unit 14. Preferably, detection device 14 is a hand-held or stationary photoresponsive device with a viewing window 20 for allowing the operator to position register the symbols within the viewing field. An image splitter such as partially silver mirror 22 reflects an image of the symbols through optics 24 and onto sensor matrix 26. Matrix 26 is preferably charge injection device with self scanning capability. Detector 18 may also have a light source 28 for providing a uniform and/or adjustable illumination of the symbols within the viewing field. Detector 18 may scan the viewing field line by line defining a matrix of image elements. However, a photoresponsive matrix with scanning capability is preferred, in which each symbol element corresponds to a matrix element. The matrix is scanned to provide a column by row-digitized data flow through automatic gain control 30 into modifier subsystem 12 at input 36. The enhanced image data at output 38 of enhancer 12 is loaded into RAM 42 of analyzer 40. Symbol analyzer 40 is an Intel 8080 microprocessor which identifies the enhanced images via a peephole recognition algorithm in ROM 44, and translates the recognized image into binary data which is processed to a suitable terminal 50 such as a cash register as shown, or any other accounting or data flow device.

Figures 3B, 3C:
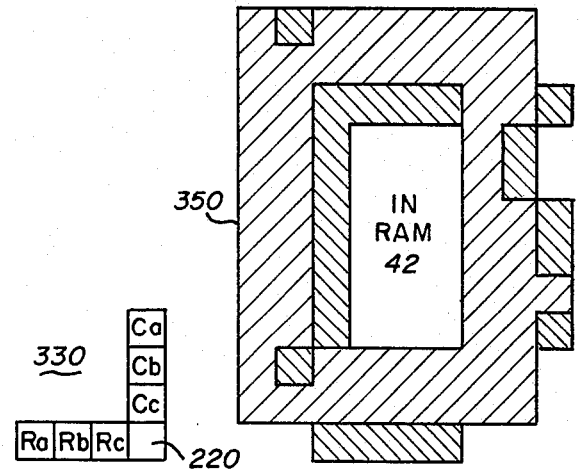

FIG. 2 shows a one bit stroke widener 200 embodiment of symbol element enhancer 12 for vertically and horizontally stretching the stroke symbol 16 as shown in FIG. 3A and 3B and 3C. Enhancer 12 receives N vertical scans or columns of M bits each from detection device 18. The N colummns by M rows of digital data are clocked through four serially connected shift registers 210A, 210B, 210C, and 210D, each M locations long. Data from the first vertical scan fills shift register 210A. This data then overflows into shift register 210B at the time when data from the next vertical scan (next column) begins to fill shift register 210A. Adjacent places between shift registers always contain bit data from the same row of the matrix. A band of row data four bits wide is continuously shifted through shift registers 210.

As each bit passes through a subject location 220, the data in an examination zone is examined to determine if the subject bit should be white or black. In the FIG. 2 widening embodiment the examination zone is reverse L-shaped as shown in FIG. 3B and is formed by subject location 220, plus the three vertically adjacent locations Ca, Cb, and Cc in register 210D, plus the three horizontally adjacent locations Ra, Rb, and Rc. Location 220 plus the three C locations correspond to four adjacent elements of the matrix in the same column, and location 220 plus the three R locations correspond to four adjacent matrix elements in the same row.

Output 38 of widener 200 is 1 (black) if any input to output gate 230 is 0, which may occur in any one of the following five conditions:

I. Cc is 1 (black) and Cb is 0 (white).
II. Cc is 1 (black) and Ca is 0 (white).
III. Rc is 1 (black) and Rb is 0 (white).
IV. Rc is 1 (black) and Ra is 0 (white).
V. 220 is 1 (black).

The above conditions are summarized in the following Truth Table and algorithm.

| Ca | Cb | Cc | 220 | Output |
|----|----|----|-----|--------|
| 0 | 0 | 0 | 0 | 0 |
| 0 | 0 | 0 | 1 | 1 |
| 0 | 0 | 1 | 0 | 1 |
| 0 | 0 | 1 | 1 | 1 |
| 0 | 1 | 0 | 0 | 0 |
| 0 | 1 | 0 | 1 | 1 |
| 0 | 1 | 1 | 0 | 1 |
| 0 | 1 | 1 | 1 | 1 |
| 1 | 0 | 0 | 0 | 0 |
| 1 | 0 | 0 | 1 | 1 |
| 1 | 0 | 1 | 0 | 1 |
| 1 | 0 | 1 | 1 | 1 |
| 1 | 1 | 0 | 0 | 0 |
| 1 | 1 | 0 | 1 | 1 |
| 1 | 1 | 1 | 0 | 0 |
| 1 | 1 | 1 | 1 | 1 |

1 = Black, 0 = White
Output 38 = 220 + $\overline{Ca}$ Cc + $\overline{Cb}$ Cc + $\overline{Ra}$ Rc + $\overline{Rb}$ Rc Vertical widening logic 240 receives the data in the three C locations and provides a 0 at the output of NAND gate 242 only if Cc is 1 (black) and Cb is 0 (white) — Condition I; and 0 at the output of NAND gate 244 only if Cc is 1 (black) and Ca is 0 (white) — Condition II. Similarly, horizontal widening logic 250 establishes Conditions III and IV through NAND gates 252 and 254. Black override channel 260 from examination location 220 to summation logic 230 insures that output 38 will be 1 (black) if the subject element is 1 (black) — Condition V. Widener 200 can add black elements to the in-core image in RAM 42, but widener 200 cannot subtract black elements.

FIG. 3A shows a typical image 310 in matrix 26 after exposure to a symbol on merchandise 14. Edge irregularities and voids appear in matrix image 310 due to print and paper imperfections, threshold variations, and approximations involved in reconstructing the symbol in unit-sized elements. FIG. 3B illustrates the L-shaped examination zone formed in shift register 210 by locations 220, Ca, Cb, Cc, Ra, Rb, and Rc. The R locations contain corresponding row data from the three subsequent vertical scans and the C locations contain immediately previous data from the subject scan. FIG. 3C illustrates widened digital image 350 which is available for identification from RAM 42. The shaded elements have been added by widener 200. Many of the voids and edge irregularities have been eliminated. The stroke of in-core image 350 is wider thus minimizing chances of offset during the recognition process.

The algorithm of widening logic 240 and 250 could be designed to widen the stroke uniformly to three bits, instead of adding a single bit in places where the stroke is either one bit or two bits wide. As a result all fonts in matrix 26 having one element strokes, two element strokes, or three element strokes would have a three bit stroke in RAM 42.

Figure 4:
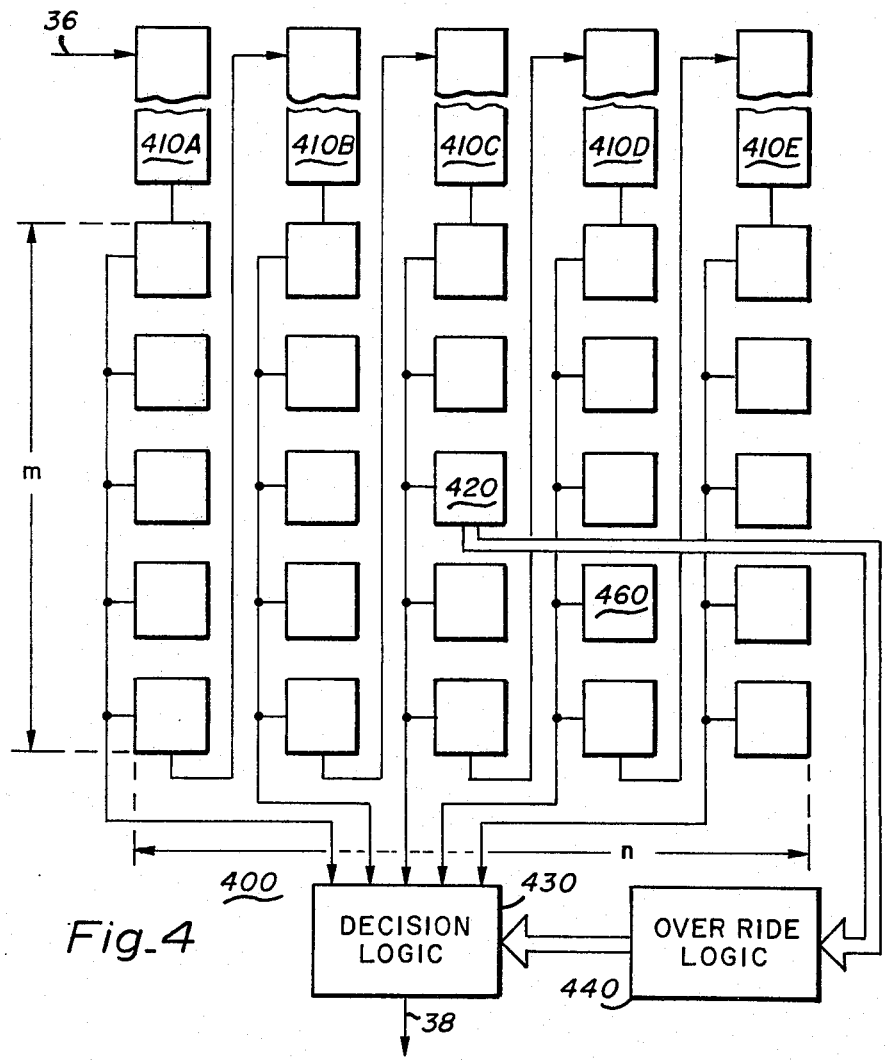
FIG. 4 is a block diagram of a general enhancing embodiment having a matrix examination zone.

FIG. 4 shows a general embodiment 400 of enhancing the recognition of the digital image. The digital data stream of N columns each M bits long from input 36 is shifted into column registers 410A–E. The examination zone in the general case is an area $n$ locations by $m$ locations (5×5 as shown in FIG. 4). Data from matrix 26 passes registers 410 in a band 5 rows wide maintaining the geometrical configuration of the matrix image (which is a digital approximation of the symbol). As each bit is shifted through examination bit 420 at the center of the n×m examination zone, the 24 bits ($n \times m - 1$) in the two adjacent rows and columns are examined to determine what the state of subject bit 420 will be.

General embodiment 400 is highly flexible and readily implemented to accomplish a variety of tasks for enhancing the recognizability of the data flowing therethrough. The following examples are illustrative of the scope of embodiment 400:

EXAMPLE I

Background Noise Reduction

Logic 430 determines that subject bit 420 is white if all the remaining 24 bits are white. Any random one bit smear on the information tag of unit 14 which is at least two bits removed from other black bits will not pass through to the in-core image in RAM 42. A broader background noise control may be effected by requiring that only the eight bits immediately adjacent to subject bit 420 be white. All insular black bits will be eliminated. One bit symbols such as decimal points and punctuation may be preserved by a black override logic 440 which takes into account the position of the one bit symbol relative to other adjacent symbols. Background noise formed by two (or more) adjacent black bits may be eliminated by permitting one (or more) black bit adjacent to subject bit 420 in an otherwise all white examination zone.

EXAMPLE II

Void Noise Reduction

White printing voids of predetermined dimensions may be filled in by making the subject bit black if all the remaining bits in the n×m examination zone are black, except for predetermined bit adjacent to subject bit 420 which may be white or black.

EXAMPLE III

Edge Dressing

One bit voids extending into the print and similar black protuberances are surrounded on three sides by bits of the opposite color. These edge irregularities may be eliminated by a weighted algorithm in logic 430 which requires subject bit 420 to take on the color state of the majority of surrounding bits.

EXAMPLE IV

Symmetrical Stroke Widener

A cross-shaped examination zone formed by the four elements in the same row as subject element 420 intersected by the four elements in the same column may be employed to widen a single element stroke width into a three-element stroke width by adding an element in each direction. Subject element 420 would be black if any element immediately adjacent thereto was black and was followed by a white element (one element removed from subject element 420). The widening would occur by a single element expansion up, down, to the left, or to the right.

CONCLUSION

It will be apparent to those skilled in the art that various changes may be made in the described apparatus without departing from the scope of the invention. For example, the examination zone may have other dimensions and shapes, and more complex algorithms may be employed to analyze the states of the examination zone elements in more detail. Several enhancement systems may be employed in cascade, i.e. a noise reducer or void filler may be employed in front of a stroke widener to maximize recognition reliability. The field view may include more than one character, and character separation could readily be determined by monitoring for an entire column or vertical scan of white elements. Unit 14 may be any package or item and the symbols may be a character in a price, inventory number, serial number, address, or other information, and may be in any language or code.

We claim as our invention:

1. A system for enhancing digital image data from input symbols, based on the status of the elements within an examination zone associated with each element of the digital image, comprising:
    digitizer means responsive to the input symbols for providing a data stream digital image thereof;
    data flow means for systematically advancing each element of the data stream digital image to an examination status, and holding the states of the elements within the examination zone associated with the examined element; and
    logic means responsive to the states of the elements in the examination zone for widening the stroke width within the digital image to a uniform width in accordance with a set of predetermined state conditions in the examination zone.

2. The system of claim 1, wherein the digitizer means comprises:
    a matrix of photoresponsive elements of horizontal rows and vertical columns; and
    an interrogation means for systematically determining the state of the elements in the matrix by scanning the matrix to provide the stream digital image thereof.

3. The system of claim 2, wherein:
    the logic means widens the stroke width horizontally in response to the states of elements within the examination zone which are from the same row of the matrix as the examined element, and
    the logic means widens the stroke width vertically in response to the states of elements within the examination zone which are from the same column of the matrix as the examined element.

4. The system of claim 3, wherein the matrix is scanned vertically by columns.

5. The system of claim 3, wherein the photoresponsive elements are charge injection devices for holding a charge image of the symbol.

6. The system of claim 3, wherein the bits of the digital data stream have two states, one state for indicating image portions of the matrix and the other state for indicating background portions of the matrix.

7. The system of claim 6, wherein the two digital states are high and low for distinguishing between pigmented areas and unpigmented areas of the input symbol.

8. The system of claim 3, wherein at least a portion of the digital data flow has a greater than binary base for representing more than two states of the input symbol.

9. The system of claim 3, wherein the data flow means comprises:
    storage means for holding the states of the examination zone; and
    control means for advancing the digital data stream through the storage means and synchronizing the matrix scanning with the advancement of the digital data stream.

10. The system of claim 9, wherein the storage means shift registers clocked by the control means.

11. The system of claim 9, wherein the examination zone has a vertical leg and a horizontal leg with the examined element at the intersection of the legs.

12. The system of claim 11, wherein the horizontal leg of the examination zone includes matrix elements from the same row as the examined element and the vertical leg of the examination zone includes matrix elements from the same column as the examined element.

13. The system of claim 12 wherein each leg of the examination zone is four elements long including the examined element.

14. The system of claim 13, wherein the logic means is responsive to the states of the elements in the horizontal leg for including the examined element into the digital image if
    a. the element in the horizontal leg adjacent to the examined element is part of the digital image; and
    b. either of the other elements in the horizontal leg is not part of the digital image.

15. The system of claim 13, wherein the logic means is responsive to the states of the elements in the vertical leg for including the examined element into the digital image if
    a. the element in the vertical leg adjacent to the examined element is part of the digital image; and
    b. either of the other elements in the vertical leg is not part of the digital image.

* * * * *